(12) United States Patent
Hoheisel et al.

(10) Patent No.: US 6,968,041 B2
(45) Date of Patent: Nov. 22, 2005

(54) ANTISCATTER GRID OR COLLIMATOR

(75) Inventors: Martin Hoheisel, Erlangen (DE); Hartmut Sklebitz, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 70 days.

(21) Appl. No.: 10/772,471

(22) Filed: Feb. 6, 2004

(65) Prior Publication Data

US 2004/0156479 A1 Aug. 12, 2004

(30) Foreign Application Priority Data

Feb. 7, 2003 (DE) .................. 103 05 106

(51) Int. Cl.⁷ ............................. G21K 1/00

(52) U.S. Cl. ...................... 378/154; 378/155

(58) Field of Search ............... 378/154, 155; 250/505.1

(56) References Cited

U.S. PATENT DOCUMENTS

| | | | |
|---|---|---|---|
| 6,366,643 B1 * | 4/2002 | Davis et al. | 378/154 |
| 6,408,054 B1 * | 6/2002 | Rahn et al. | 378/154 |
| 2003/0089857 A1 | 5/2003 | Hoheisel et al. | 378/154 |
| 2003/0235273 A1 * | 12/2003 | Spahn | 378/154 |

FOREIGN PATENT DOCUMENTS

| | | |
|---|---|---|
| DE | 10241424.6 | 9/2002 |
| DE | 101 51 568 A1 | 5/2003 |

* cited by examiner

Primary Examiner—Craig E. Church
Assistant Examiner—Jurie Yun
(74) Attorney, Agent, or Firm—Harness, Dickey & Pierce, P.L.C.

(57) ABSTRACT

An antiscatter device, such as a grid or collimator, is for absorption of secondary radiation which is scattered by an object. The antiscatter device includes an absorption structure with a plurality of elements. Two or more elements form a cell-like structure with a beam channel for primary radiation. Further, the elements and thus the cell-like structures are arranged and/or formed such that the absorption structure has a non-regular, aperiodic pattern.

34 Claims, 2 Drawing Sheets

ANTISCATTER GRID OR COLLIMATOR

The present application hereby claims priority under 35 U.S.C. §119 on German patent application number DE 103 05 106.6 filed Feb. 7, 2003, the entire contents of which are hereby incorporated herein by reference.

FIELD OF THE INVENTION

The invention generally relates to an antiscatter device, such as a grid or collimator. More preferably, it relates to an antiscatter grid or collimator for absorption of secondary radiation which is scattered by an object. The antiscatter grid or collimator may have an absorption structure including a large number of wall-like or web-like elements. Two or more elements in each case may form a cell-like structure with a beam channel, which is surrounded at the sides, for primary radiation.

BACKGROUND OF THE INVENTION

Nowadays, X-ray imaging is subject to stringent requirements for the image quality of the recordings. In these recordings, such as those which are made in particular for medical X-ray diagnosis purposes, an object to be examined has X-ray radiation passed through it from an X-ray source which is approximately in the form of a point. The attenuation distribution of the X-ray radiation is recorded two-dimensionally on that face of the object which is opposite the X-ray source. In addition, in the case of computer tomography, the X-ray radiation that has been attenuated by the object is recorded line-by-line.

Solid-state detectors are increasingly being used as radiation detectors, in which semiconductor elements which act as receivers are arranged in the form of a matrix. The X-ray recording which is obtained is composed of a large number of individual pixels, with each pixel ideally corresponding to the attenuation of the radiation through the object on a linear axis from the X-ray source to that location on the detector surface which corresponds to the respective pixel. The radiation which strikes the detector on this linear axis is referred to as primary radiation.

However, as the X-ray beams pass through the object, they necessarily interreact with the object, leading to scatter effects. Thus, in addition to the actual primary beams which pass through the object without being scattered, secondary beams occur which strike the detector from directions other than the linear axis. These secondary beams, which can make up a very large portion of the total signal drive level of the detector, represent an additional noise source and reduce the capability to identify fine contrast differences.

It is known for so-called antiscatter grids to be used in order to reduce the scattered radiation striking the detector. Known antiscatter grids include regularly arranged structures which absorb X-ray radiation and between which aperture channels or the like are provided for primary radiation. In this case, a distinction is drawn between focused grids and unfocused grids. In the case of focused grids, the aperture channels and hence the absorption structures which bound them, are aligned with the focus of the X-ray source. However, this is not the case with unfocused grids, in which the channels are at right angles to the surface.

An antiscatter grid operates in such a way that the secondary radiation is primarily absorbed via the absorbent structures. Further, in the case of unfocused grids, a proportion of the primary radiation is also absorbed by them. Thus, it is not part of the proportion of the radiation that strikes the detector and produces the actual X-ray image. The aim in this case is always on the one hand for the scattered beams to be absorbed as well as possible while, on the other hand, having as high a proportion of the primary radiation as possible passing through the grid without being attenuated.

A reduction in the scattered beam components can be achieved by use of a high aspect ratio; namely a high ratio of the height of the grid to the thickness or to the diameter of the aperture channels. However, the thickness of the absorbent elements which are located between the channels makes it possible, in particular, for image interference to be caused by absorption of a portion of the primary radiation. Particularly when using the grid in conjunction with a matrix detector, any inhomogeneity in the grid leads to image interference as a result of the grid being imaged in the X-ray image. There is a risk here of the projection of the structures of the detector elements and of the antiscatter grid interfering with one another, as a result of which Moiré interference phenomena can occur.

These problems also occur in the case of a grid such as that described in the previously published patent application DE 102 41 424.6. Here, a novel grid type is described, in comparison to the conventional lead laminate grids. Conventional lead laminate grids are so-called "laid grids", in which very thin lead laminates and elements which are generally composed of paper, effectively form the aperture slots between the laminates and are transparent to radiation are laid alternately. However, the manufacturing precision for grids such as these is limited, leading to problems in particular in the case of solid-state detectors.

This is in contrast to the grid from DE 102 41 426, which is produced by use of a rapid prototyping technique by solidification of an applied material in layers. This technique allows very fine and exact structures to be formed, which are the basis for the formation of the absorption structure. These structures are formed corresponding to the profile of the insensitive intermediate areas between two detector elements in the solid-state matrix detector. Namely, these structures to which an absorption coating is applied run exactly over these intermediate areas and not above the active detector surface. Although the capability to identify raster images can be reduced with this known grid and can be shifted to such a high spatial frequency range that it is still barely possible to image them sharply by use of the imaging systems, the geometry of the absorption structure nevertheless results in difficulties which can lead to the formation of Moiré phenomena in the radiation image which is produced.

Similar difficulties to those in X-ray diagnostics also occur in nuclear medicine, particularly when using gamma cameras. In this case as well, care must be taken to ensure that as few scattered gamma quanta as possible reach the detector. In this type of examination, the radiation source for the gamma quanta is located in the interior of the object being examined. After injection of an unstable nuclide, an image of an organ is produced by detection of the quanta which are emitted from the body by the nuclide decomposition, with the time profile of the activity or the decomposition in the organ allowing conclusions to be drawn about its operation.

In this technique, a collimator which defines the projection direction of the image is placed in front of the gamma detector, corresponding to an antiscatter grid. The method of operation and structure of this collimator essentially correspond to those of the antiscatter grid described initially.

SUMMARY OF THE INVENTION

An embodiment of the invention is therefore based on the problem of specifying an antiscatter device, such as a grid or a collimator, in which the risk of formation of undesirable images, in particular of Moiré images, is reduced or even avoided altogether.

In order to solve this problem and/or other problems, an embodiment of the invention provides, in an antiscatter grid, for the elements and thus the cell-like structures to be arranged and/or formed such that the absorption structure has a non-regular, aperiodic pattern.

The grid or collimator according to an embodiment of the invention is distinguished firstly in that the absorption structure is formed using a large number of elements which are connected to one another, in a similar way to those in the grid according to DE 102 41 424.6, the entire contents of which is hereby incorporated herein by reference. In contrast to the situation in the grid described in DE 102 41 424.6, in which two elements are positioned at an angle of 90° to one another, four elements in each case form a rectangular cell with a central aperture channel, thus forming a regular, symmetrical structure, the antiscatter grid according to an embodiment of the invention provides for the absorption structure to have cell-like structures which are formed and arranged without any regularity. Thus, cells which do not have a rectangular structure are produced depending on the number of elements which form a cell-like structure.

Provision, in one embodiment, may also be made for these cell-like structures to be arranged and/or formed such that the absorption structure has a non-regular, aperiodic pattern. Thus, the elements according to an embodiment of the invention may be arranged, and the structures pronounced, such that there is no regularity anywhere in the entire absorption structure. Therefore, an absorption structure may be produced which is not regular and has no periodicity whatsoever.

The lack of regularity and/or symmetry very largely and particularly advantageously avoids Moiré phenomena. This is because, as has been found, these are caused primarily by the regularity and symmetry of known grids—irrespective of whether these are laminate grids or grids according to DE 102 41 424.6. Since X-ray images in the form of matrices have strictly symmetrical pixel arrangements (generally square, regularly arranged pixels), virtually no Moiré interference can occur in the image in the form of interference between this symmetrical pattern and the aperiodic pattern of the absorption structure.

In this case, it should be mentioned that the grid or collimator according to an embodiment of the invention can be used not only with a matrix detector, but also with other imaging systems with a homogeneous X-ray converter layer (for example digital luminescence radiography (memory film), X-ray image intensifiers, or film sheet systems).

In a development of the idea of an embodiment of the invention, it is possible to provide for two adjacent elements to be at an angle which is not equal to 90° to one another, with four elements in each case expediently forming a cell-like structure in the form of a rhombus. Two different rhombus types are expediently provided, each having two different angles between two elements. The absorption structure advantageously has a Penrose pattern. Penrose patterning such as this comprises two rhombus types with equal edge lengths, with the angles in one rhombus type being 72° and 108°, and those in the other rhombus type being 36° and 144°.

Owing to the absorption structure which is not oriented with the matrix of the associated radiation detector, coverage of the active detector surface thus may result in shadowing which would lead to a reduction in the active pixel area. This can advantageously be counteracted by the wall-like or web-like elements including a material which is transparent to X-ray or gamma radiation. The inner surfaces of the elements may be provided with a coating which absorbs secondary radiation, in particular with a lead coating. A polymer synthetic resin may expediently be used as the material to form the elements and thus the basic structure of the absorption structure. The coating itself may be expediently sputtered on or is deposited electrochemically. The coating may normally have a thickness of about 5 μm, although the radiation channels may be filled with material which is transparent to radiation, if required.

The grid or the basic structure to form the absorption structure may expediently be produced by stereolithography using a rapid prototyping technique. The use of this rapid prototyping technique in the formation of the basic structure allows highly filigrane structures to be produced with very high accuracy.

In stereolithography, a UV laser beam is computer-controlled to "write" the respective previously defined structure of the individual layers of a 3D volume model of the basic structure in a liquid polymer resin. The influence of the laser results in the polymer resin being cured at the illuminated points or on the illuminated surfaces. Once the first structure level has been "written", the structure platform on which the structure is formed is lowered somewhat, after which a new resin layer is applied and the second structure level is "written". This process is repeated until the desired structure is achieved. As can be seen, this technique on the one hand can be used to produce structures which are configured in any desired manner, and on the other hand also to produce structures with very thin wall thicknesses in the region of 100 μm or less.

At this point, it should be mentioned, with regard to the production of the basic structure of the absorption structure or of the antiscatter grid or collimator itself, that reference should be made to DE 102 41 424.6, whose entire disclosure content is incorporated in the present disclosure by reference for purposes referring to any of the features disclosed there in the context of the present disclosure. In addition, it is also possible to produce honeycomb-like structures using different methods, which structures have a Penrose pattern and either themselves have an absorbing effect or have an absorption coating.

In addition to the antiscatter grid or collimator itself, an embodiment of the invention also relates to an arrangement including a radiation detector, in particular an X-ray or gamma detector and an antiscatter grid or collimator, with the antiscatter grid or the collimator being designed in accordance with the manner described above. In this case, for the purposes of this arrangement according to an embodiment of the invention, the radiation detector may advantageously be a radiation detector which has detector elements which are arranged in the form of a matrix in the row and column directions, that is to say a solid state radiation detector.

A specific refinement embodiment of the arrangement provides for the antiscatter grid or the collimator to be arranged separately from the radiation detector, with both the antiscatter grid or the collimator and the radiation detector being immovable or not being moved, at least during recording of a radiation image. While the image recording makes use of a "rigid" arrangement, neither the grid/collimator nor the detector is moved. Virtually no Moiré interference can be ensured owing to the configuration of the antiscatter grid/collimator according to an embodiment of the invention with the non-regular, aperiodic absorption structure, even with a "rigid" arrangement such as this.

Another specific refinement of an arrangement according to an embodiment of the invention in contrast provides for the antiscatter grid or the collimator to be movable, in particular displaceable, with respect to the stationary radiation detector. In this case as well, the grid/collimator and the detector are thus separated. However, in this refinement of an embodiment of the invention, the grid/collimator can be moved with respect to the detector, as is already the case in known arrangements.

A conventional grid drive can be used for this purpose which ensures the movement of the grid/collimator and thus that the final residues are wiped away from the grid/collimator image. In this case as well, the arrangement—in the same way as the arrangement described above as well—may either include a solid state radiation detector, or else an arrangement is feasible with an X-ray image intensifier/television/ imaging system, an a-Si panel imaging system, a film sheet system or a DLR system (DLR=Digital Luminescence Radiography).

Finally, another embodiment of an arrangement provides for the antiscatter grid or the collimator to be firmly mechanically connected to the radiation detector. This may be implemented directly or via an intermediate layer. A fixed assembly between the grid/collimator and the detector is thus proposed in this case.

Since the grid/collimator is coated with absorber material only in the inner faces of the cells, the intensity modulation which is produced by the grid/collimator is relatively small. The remaining intensity differences may be overcome, if necessary, by pixel-dependent gain correction.

Further advantages, features and details of the invention will become evident from the exemplary embodiment of the application described in the following text and from the drawings.

BRIEF DESCRIPTION OF THE DRAWINGS

The present invention will become more fully understood from the detailed description of preferred embodiments given hereinbelow and the accompanying drawing, which is given by way of illustration only and thus are not limitative of the present invention, and wherein.

DETAILED DESCRIPTION OF THE PREFERRED EMBODIMENTS

Figure 1:
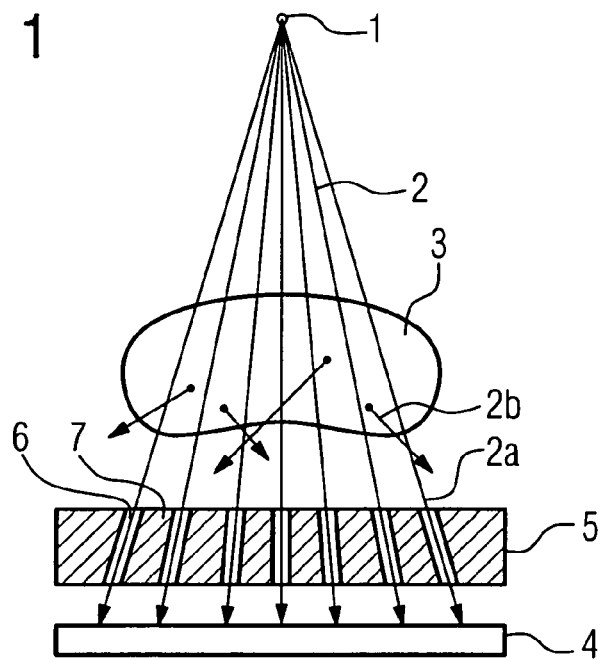
FIG. 1 shows an outline illustration of the effect of an antiscatter grid for X-ray image recording.

FIG. 1 uses an outline illustration to show the method of operation of an antiscatter device, such as a grid for X-ray diagnosis. The X-ray beams 2 which originate from the focus of an X-ray source 1 propagate in straight lines in the direction of the object 3. They pass through the object 3 and, as straight-line primary radiation 2a, strike a radiation detector 4 which is positioned downstream of the object 3, where the primary beams 2a result in a spatially resolved attenuation distribution for the object 3.

A portion of the radiation 2 which passes through the object is, however, scattered in the object. This results in scattered radiation 2b which does not contribute to the desired image information, corrupts the actual image information when it arrives at the detector, and makes the signal-to-noise ratio worse.

In order to improve the disadvantageous influences of the scattered radiation 2b on the image which is recorded at the detector end, an antiscatter grid 5 is provided, which is arranged between the object 3 and the detector 4. The antiscatter grid 5 has beam channels 6 which are bounded by a basic structure 7. The basic structure 7 itself forms an absorption structure, by which the secondary radiation 2b which strikes it is absorbed.

As is shown in FIG. 1, the beam channels 6 are focused in the direction of the X-ray source 1, that is to say they are aligned in this direction. Incident primary radiation 2b passes through the antiscatter grid 5 on a straight-line path, as is shown in FIG. 1, to the detector 2, and all the other radiation which is at an angle to this is absorbed, or is considerably attenuated, by the antiscatter grid 5.

Figure 2:
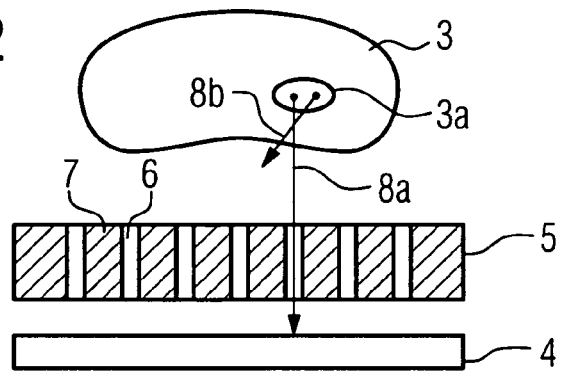
FIG. 2 shows an outline illustration of the effect of a collimator for a nuclear/medical recording.

FIG. 2 shows an outline illustration of the effect of a collimator for a nuclear/medical recording. The situation relating to image recording for nuclear medicine purposes is similar. A device which emits gamma beams but is not shown in any more detail is introduced into an organ 3a of an object 3 being examined, where it is enriched and emits gamma quanta 8a as it decomposes, as well as gamma quanta 8b as scattered radiation—due to scatter in the organ 3a or in the object 3. The primary radiation is passed in the form of quanta 8a via a collimator 5 directly to the detector 4, while the secondary radiation, which is at an angle to this, is absorbed by the collimator 5, in the form of the gamma quanta 8b.

Figure 3:
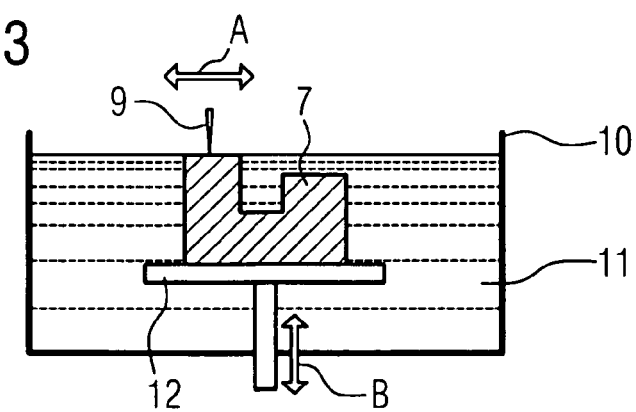
FIG. 3 shows an outline illustration of the stereolithography technique.

FIG. 3 uses an outline sketch to show the production of an antiscatter device, such as a grid, according to an embodiment of the invention using a rapid prototyping technique, primarily based on stereolithography. A laser beam 9 is pointed at the surface of a polymer 11 which is located in a container 10 and which can be crosslinked by ultraviolet. As indicated by the double-headed arrow A, the laser beam 9 is moved over the surface, with the movement control (which is carried out via a suitable control computer) being based on a three-dimensional volume model of the basic structure 7 to be produced.

The pattern of the basic structure 7 to be produced is now effectively written into the polymer resin 11 via the moving laser beam 9, leading to solidification of a corresponding resin layer, depending on the pattern that is written. This resin layer is formed on a platform 12 which is lowered, as is illustrated by the double-headed arrow B after the "writing" of the first level, after which the second structure layer is written. The laser obviously allows very fine, filigrane structures to be written, in particular due to the good focusing capability of the laser, so that even very thin-walled structures with any desired configuration can be produced. The basic structure 7 may in this case be formed either directly on the platform 12 or on a mounting plate which is not illustrated in any more detail.

Figure 4:
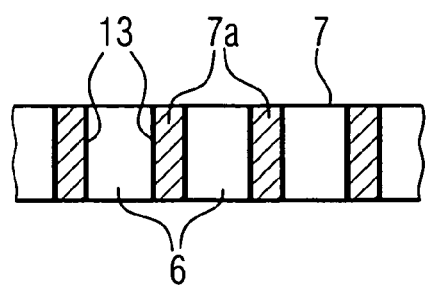
FIG. 4 shows an outline illustration, in the form of a section through the absorption structure of an antiscatter grid according to an embodiment of the invention.

FIG. 4 shows an antiscatter device 5, such as a grid or a collimator, according to an embodiment of the invention in the form of a section, on the basis of which the principles of its production method are also evident. As has already been described with reference to FIG. 3, the basic structure 7 is formed by local curing of the polymer resin. Once the basic structure 7 has been completed, it is coated with an absorbent material which is deposited within the beam channels 6 on the inner faces of the elements 7 which form the basic structure, with the inner faces defining the beam channels 6. As can be seen, the inner faces are coated with the absorbent layer 13. The coating can be applied electrochemically and/or by sputtering.

In order to reproduce the transparency of the basic structure 7, which is composed of a polymer that is transparent to radiation, it is advantageous to expose the end faces of the elements 7a once again. This may be done, for example, by chemical etching of the absorption layer located there, or else mechanically. Thus, the elements 7a likewise form aperture channels for the primary radiation owing to their radiation transparency, while the actual absorption takes place exclusively on the very thin (approximately 5 $\mu$m) absorbent layer 13. Depending on the specific embodiment or arrangement of the antiscatter grid which is produced in this way, this may now either be applied directly to the detector 7, for example by adhesive bonding, that is to say forming a fixed arrangement. As an alternative to this, it is possible for the antiscatter grid or the collimator also to be arranged separately from the detector 4, as will be described in the following text.

Figure 5:
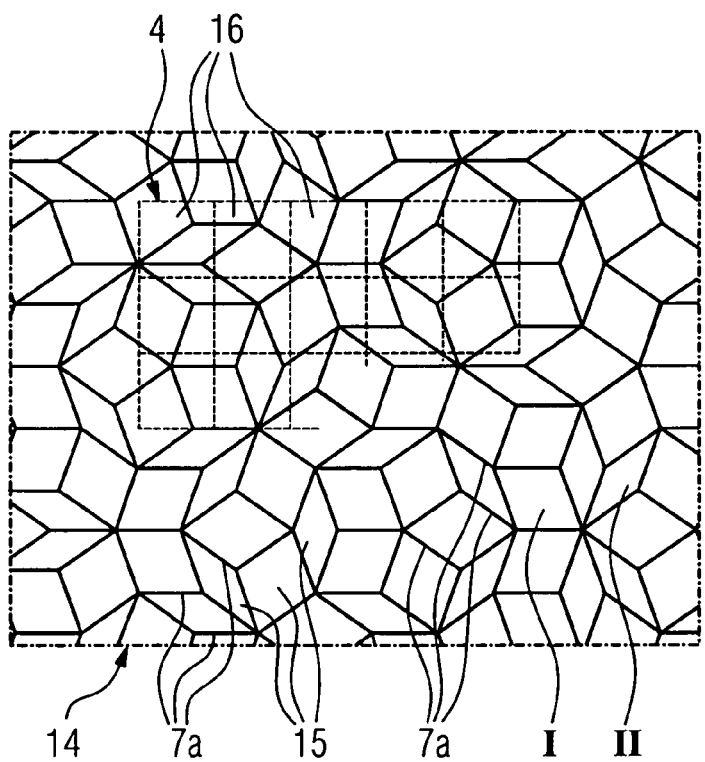
FIG. 5 shows a plan view of an antiscatter grid or collimator according to an embodiment of the invention.

FIG. 5 shows a plan view of the antiscatter device shown in FIG. 4, with each element 7a in this case being illustrated for the sake of simplicity with its coating 13 on both sides in the form of a single line. The basic structure 7 shown there forms, in its totality, an absorption structure 14, including the basic structure 7 with the coatings 13 applied to it. Four elements 7a with their inner surface coatings in each case form a cell-like structure 15, in which, as can be seen, the absorption structure 14 includes any desired large number of such cell-like structures 15.

As can be seen, the web-like or wall-like elements 7a are at an angle which is not equal to 90° to one another. Each cell-like structure is in the form of a rhombus.

A distinction is drawn between two rhombus types, namely Type I and Type II. In the rhombus Type I, the two small angles are 72° and the two large angles are 108°, while in the rhombus Type II, the two small angles are 36° and the two large angles are 144°.

The elements 7a and the individual cell-like structures 15 are now arranged with respect to one another such that, overall, they result in a non-regular, aperiodic pattern over the surface of the absorption structure 14. Thus, there is no symmetry whatsoever and no center of symmetry on the structure surface. None of the cell-like structures 15 are rectangular.

In addition to the described pattern, other patterns and polygonal shapes of the structures 15 are also feasible, provided that the resultant overall structure is aperiodic. The use of rapid prototyping for production of the absorption structure allows any desired structures/shapes to be produced easily.

As FIG. 5 shows, there is no orientation or position relationship whatsoever between the absorption structure 14 and the detector elements 16 of the radiation detector 4 with which the absorption structure 14 is associated. The detector elements 16 are arranged in the form of a matrix, with the detector elements 16 being demonstrated only by use of dashed lines in FIG. 5.

As is known, each detector element 16 includes a radiation-sensitive detector area and radiation-insensitive intermediate areas between two elements. The detector elements 16 are also referred to as pixels. One detector 4 may, for example, have 3000×3000 pixels (detector elements) with a size of 143×143 $\mu$m. A switching element which is associated with a detector element, for example a TFT transistor, is located in each radiation-insensitive intermediate area.

The configuration of a matrix detector such as this is known per se so that there is no need to describe it in any more detail here. However, it is evident from FIG. 5 that the absorption structure 14, which has a Penrose pattern, is not oriented with respect to the pixel or detector element arrangement of the detector 4, owing to its aperiodicity and asymmetry, but is arranged in a completely non-regular manner with respect to it. This necessarily results in the active pixel area being covered by the wall-like or web-like elements 7a.

However, since the elements 7a are transparent to radiation, this has no interference effect since the incident primary radiation can pass through the elements 7a, while secondary radiation is absorbed via the absorbent coating 13 which is applied to the sides of the elements 7a. The non-regular nature of the absorption structure 14 means that there is no disturbing interference between the detector matrix and the absorption structure 14. Thus, Moiré phenomena is avoided in the image which is read on the detector side.

Figure 6:
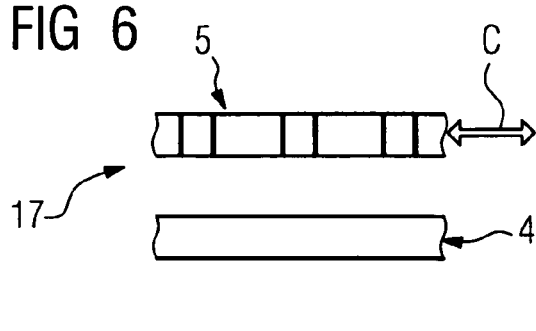
FIG. 6 shows an arrangement including an antiscatter grid/collimator and a detector which is separate from it.

FIG. 6 shows an arrangement 17 including an antiscatter device 5, such as a grid or collimator, and a detector 4 which are both arranged separately from one another. The antiscatter grid/collimator 5 and the detector 4 may in this case remain stationary while an image is being recorded, that is to say they are not moved with respect to one another in order to wipe out raster images, as would be done primarily by moving the grid/collimator. Furthermore, this is not absolutely essential owing to the aperiodicity of the absorption structure configuration of the antiscatter grid/collimator according to an embodiment of the invention. As is indicated by the double-headed arrow C, it is equally possible to move the grid/collimator with respect to the stationary detector 4.

Figure 7:
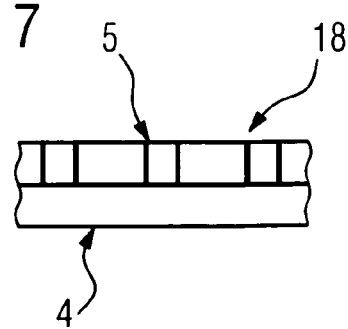
FIG. 7 shows an arrangement of an antiscatter grid/collimator firmly connected to a detector.

Finally, FIG. 7 shows a further arrangement 18 in which the antiscatter grid/collimator 5 is firmly connected to the detector 4. The two thus form a unit which cannot be detached. Expediently, they are adhesively bonded to one another. This can be achieved without any major complexity since the aperiodicity and non-regular nature of the pattern of the absorption structure 14 with respect to the alignment of the antiscatter grid/collimator 5 with respect to the detector element matrix of the detector 4 means that there are no constraints. Thus, the grid can be arranged in any desired position with respect to the detector matrix. Further, there is no need to ensure that the elements 7a are coincident with those intermediate areas of the detector matrix which are not sensitive to radiation.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An antiscatter device for absorption of secondary radiation scattered by an object, comprising:
an absorption structure including a plurality of elements, wherein at least two elements form a cell-like structure with a beam channel for primary radiation, and wherein a plurality of cell structures are at least one of arranged and formed such that the absorption structure includes a non-regular, aperiodic pattern.

2. The antiscatter device as claimed in claim 1, wherein two adjacent elements of a cell-like structure are at an angle that is not equal to 90° with one another.

3. The antiscatter device as claimed in claim 2, wherein four elements form a cell-like structure in the form of a rhombus.

4. The antiscatter device as claimed in claim 3, wherein two different rhombus types are provided among the plurality of cell-like structures, each having two different angles between two elements.

5. The antiscatter device as claimed in claim 4, wherein the absorption structure has a Penrose pattern.

6. The antiscatter device as claimed in claim 1, wherein the absorption structure is produced by stereolithography using a rapid prototyping technique.

7. The antiscatter device as claimed in claim 1, wherein the elements are at least one of wall-like and web-like, and include a material which is transparent for at least one of X-ray and gamma radiation.

8. The antiscatter device as claimed in claim 7, wherein inner surfaces of the elements are provided with a coating which absorbs secondary radiation.

9. The antiscatter device as claimed in claim 7, wherein the elements include a synthetic resin.

10. The antiscatter device as claimed in claim 8, wherein the coating is at least one of sputtered on and deposited electrochemically.

11. The antiscatter device as claimed in claim 9, wherein the coating is at least one of sputtered on and deposited electrochemically.

12. An arrangement, comprising:
a radiation detector; and
an antiscatter device as claimed in claim 1.

13. The arrangement as claimed in claim 12, wherein the radiation detector includes a plurality of detector elements arranged in the form of a matrix in row and column directions.

14. The arrangement as claimed in claim 12, wherein the antiscatter device is arranged separately from the radiation detector, with both the antiscatter device and the radiation detector being immovable, at least during recording of a radiation image.

15. The arrangement as claimed in claim 13, wherein the antiscatter device is arranged separately from the radiation detector, with both the antiscatter device and the radiation detector being immovable, at least during recording of a radiation image.

16. The arrangement as claimed in claim 12, wherein the antiscatter device is movable.

17. The arrangement as claimed in claim 13, wherein the antiscatter device is movable.

18. The arrangement as claimed in claim 12, wherein the antiscatter device is displacable with respect to a stationary radiation detector.

19. The arrangement as claimed in claim 13, wherein the antiscatter device is displacable with respect to a stationary radiation detector.

20. The arrangement as claimed in claim 12, wherein the antiscatter device is firmly mechanically connected to the radiation detector.

21. The arrangement as claimed in claim 13, wherein the antiscatter device is firmly mechanically connected to the radiation detector.

22. The arrangement as claimed in claim 20, wherein the antiscatter device is connected to the radiation detector at least one of directly and via an intermediate layer.

23. The arrangement as claimed in claim 21, wherein the antiscatter device is connected to the radiation detector at least one of directly and via an intermediate layer.

24. The antiscatter device of claim 1, wherein the device is a grid.

25. The antiscatter device of claim 1, wherein the device is a collimator.

26. The antiscatter device of claim 1, wherein the elements are at least one of wall-like and web-like.

27. The antiscatter device as claimed in claim 7, wherein the elements include a lead coating.

28. The arrangement of claim 12, wherein the radiation detector is at least one of an X-ray and a gamma detector.

29. The arrangement of claim 12, wherein the antiscatter device is a grid.

30. The arrangement of claim 12, wherein the antiscatter device is a collimator.

31. An arrangement, comprising:
means for detecting radiation; and
antiscatter means for absorption of secondary radiation scattered by an object, the antiscatter means including an absorption structure with a plurality of elements, at least two elements forming a cell-like structure with a beam channel for passing primary radiation, and at least two cell structures being at least one of arranged and formed such that the absorption structure includes a non-regular, aperiodic pattern.

32. The arrangement as claimed in claim 31, wherein the means for detecting radiation includes a plurality of detector elements arranged in the form of a matrix in row and column directions.

33. The arrangement as claimed in claim 32, wherein the antiscatter means is arranged separately from the plurality of detector elements with both the antiscatter means and the plurality of detector elements being immovable, at least during recording of a radiation image.

34. The arrangement as claimed in claim 32, wherein the antiscatter means is movable.

* * * * *